United States Patent
Zhao (10) Patent No.: US 8,130,003 B2
(45) Date of Patent: Mar. 6, 2012

(54) CAPACITIVE SENSOR CORE WITH FLEXIBLE HINGE AND SENSOR USING THE SAME

(75) Inventor: Zhiqiang Zhao, Guilin (CN)

(73) Assignees: Sheng Zhong, Guangzhou (CN); Zhiqiang Zhao, Guilin (CN); Biao Zhao, Guilin (CN)

( * ) Notice: Subject to any disclaimer, the term of this patent is extended or adjusted under 35 U.S.C. 154(b) by 447 days.

(21) Appl. No.: 12/497,259

(22) Filed: Jul. 2, 2009

(65) Prior Publication Data

US 2009/0267618 A1  Oct. 29, 2009

Related U.S. Application Data

(63) Continuation-in-part of application No. PCT/CN2007/003550, filed on Dec. 12, 2007.

(30) Foreign Application Priority Data

Jan. 4, 2007 (CN) .......................... 2007 1 0048220

(51) Int. Cl.
G01R 27/26 (2006.01)
G01L 1/00 (2006.01)
(52) U.S. Cl. ........................... 324/662; 324/661; 73/780
(58) Field of Classification Search .................. 324/662, 324/661, 658, 649, 600; 73/780, 774, 763, 73/760, 862.337, 862.626, 304 C, 514.32, 73/335.04, 718, 724; 702/47, 52
See application file for complete search history.

(56) References Cited

U.S. PATENT DOCUMENTS

| | | | |
|---|---|---|---|
| 4,578,868 A | | 4/1986 | Sasaki et al. |
| 5,391,283 A | * | 2/1995 | Shimada et al. ................... 73/10 |
| 7,221,463 B2 | * | 5/2007 | Mizuno et al. ................ 356/614 |
| 7,347,102 B2 | * | 3/2008 | Moon et al. ..................... 73/780 |
| 2009/0289641 A1 | * | 11/2009 | Kang et al. ..................... 324/660 |

FOREIGN PATENT DOCUMENTS

| | | |
|---|---|---|
| CN | 88202266 | 12/1988 |
| CN | 2072210 | 2/1991 |
| CN | 2132153 | 5/1993 |

(Continued)

OTHER PUBLICATIONS

International Search Report of PCT/CN2007/003550 dated Mar. 13, 2008 (with English translation).

*Primary Examiner* — Hoai-An D Nguyen
(74) *Attorney, Agent, or Firm* — Hamre, Schumann, Mueller & Larson, P.C.

(57) ABSTRACT

A capacitive sensor core with flexible hinge includes a main grid plate, an auxiliary grid plate, and a mechanical structure transferring the measuring quantity to the displacement between the main grid plate and the auxiliary grid plate, the mechanical structure includes a stationary element and a moving element, the auxiliary grid plate and the main grid plate are fixed to the driven portion of the moving element and the corresponding position of the stationary element respectively, the stationary element and the moving element are connected through a flexible hinge; the flexible hinge consists of at least two supporting spring leafs, one end of each of the supporting spring leafs is connected to the stationary element, the other end is connected to the moving element; the plane of each of the supporting spring leafs is perpendicular to the planes of the main and auxiliary grid plates.

31 Claims, 5 Drawing Sheets

FOREIGN PATENT DOCUMENTS

| | | |
|---|---|---|
| CN | 1101974 | 4/1995 |
| CN | 2246791 | 2/1997 |
| CN | 1187616 | 7/1998 |
| CN | 2295984 | 10/1998 |
| CN | 1229909 | 9/1999 |
| CN | 2341119 | 9/1999 |
| CN | 2348350 | 11/1999 |
| CN | 2402995 | 10/2000 |
| CN | 1299955 | 6/2001 |
| CN | 1415934 | 5/2003 |
| CN | 1844841 | 10/2006 |
| CN | 2874422 | 2/2007 |
| CN | 101000249 | 7/2007 |

* cited by examiner

CAPACITIVE SENSOR CORE WITH FLEXIBLE HINGE AND SENSOR USING THE SAME

BACKGROUND OF THE INVENTION

The present invention relates to a capacitive sensor core, and in particular to a capacitive sensor core with flexible hinge. The present invention also relates to an angular displacement sensor, an adjustable digital display caliper, a lever gauge and a micrometer which have the capacitive sensor core with flexible hinge.

In the mechanical manufacturing, digital display measuring devices are normally used to measure the precise angle, horizontal degree and obliquity. The core component of these devices may consist of mechanisms such as mechanical levers, gears, or sleeves, and the mechanism converts a measurement to a relative displacement between the main grid plate and the minor grid plate. However, since manufacturing errors, clearance of assembling and transmission of the levers, gears or sleeves exist, the clearance between the transmission components such as levers, gears and sleeves can not be removed even if the fit dimension is small and the assembling method is precise. In the precise measurement, even a small clearance may affect the measuring result greatly.

SUMMARY OF THE INVENTION

Having outlined the state of the prior art and its attendant shortages, it is an object of the present invention to provide a capacitive sensor core with flexible hinge, which avoids the clearance between the transmission components such as levers, gears and sleeves.

The above object of the present invention is achieved by the following technical solutions:

A capacitive sensor core with flexible hinge, comprises: a main grid plate; a minor grid plate; and a mechanism for converting a measurement to a relative displacement between the main grid plate and the minor grid plate; wherein the mechanism comprises a stationary arm and an active arm, the minor grid plate and the main grid plate are respectively mounted on a driven portion of the active arm and the stationary arm, the stationary arm is connected to the active arm by a flexible hinge; the flexible hinge comprises at least two supporting spring leaves, each supporting spring leaf is connected to the stationary arm at one end, and the other end of the supporting spring leaf is connected to the active arm; each supporting spring leaf is vertical to the main grid plate and the minor grid plate.

The flexible hinge between the active arm and the stationary arm has two possible structures:

1. The flexible hinge between the active arm and the stationary arm comprises the intersected supporting spring leaves, the active arm is rotated around the intersection of the supporting spring leaves as the rotation center with respect to the stationary arm, the main grid plate mounted on the stationary arm and the minor grid plate mounted on the driven portion of the active arm are the main grid plate and the minor grid plate of a capacitive angular movement sensor.

Preferably, the hinged portions of the active arm and the stationary arm are parallel with respect to each other in transverse direction, the minor grid plate on the driven portion of the active arm and the main grid plate on the stationary arm are parallel with respect to each other in longitudinal direction above the hinged portions of the active arm and the stationary arm; straight slots in diagonal direction are provided on the upper front portion or lower front portion of the hinged portion of the stationary arm and on the lower front portion or front portion of the active arm, and these two slots are vertical to the main grid plate and the minor grid plate; straight slots in diagonal direction are also provided on the lower back portion or upper back portion of the hinged portion of the stationary arm and on the upper back portion or lower back portion of the hinged portion of the active arm, and these two slots are also vertical to the main grid plate and the minor grid plate; the two ends of a supporting spring leaf are inserted in the straight slot on the upper front portion or lower front portion of the hinged portion of the stationary arm and the straight slot on the lower front portion or upper front portion of the hinged portion of the active arm respectively; the two ends of another supporting spring leaf are inserted in the straight slot on the upper back portion or lower back portion of the hinged portion of the stationary arm and the straight slot on the lower back portion or upper back portion of the hinged portion of the active arm respectively; a line passing through the intersection point of the supporting spring leaves and vertical to the main sensor grid plate and minor sensor grid plate is the virtual axis of rotation of the active arm with respect to the stationary arm. Comparing with the rotation pivot of mechanical lever, the rotation center of flexible hinge has no fit clearance, and the moving of the driving end completely synchronize with the moving of the driven portion.

Preferably, the upper and lower ends of the hinged portion of the active arm are both mounted with a horizontal pilot pin, these two horizontal pilot pins are parallel and located in a longitudinal plane, and correspondingly pin holes for receiving the pilot pins are provided on the hinged portion of the stationary arm. Horizontal dynamometric springs are connected between the stationary arm and the active arm at positions above and below the two pilot pins.

Embodiments of measuring device utilizing the capacitive angular movement sensor core with flexible hinge are as follows:

(1) A capacitive angular movement sensor, comprises:

a capacitive sensor core with flexible hinge, comprising a main grid plate, a minor grid plate and a mechanism for converting a measurement to a relative displacement between the main grid plate and the minor grid plate;

wherein the mechanism a stationary device and an active device, the minor grid plate and the main grid plate are respectively mounted on a driven portion of the active device and the stationary device, the stationary device is connected to the active device by a flexible hinge; the active device is mounted on the stationary device via the flexible hinge that is used as supporting device to form a lever-like mechanism, the active device is rotated around the rotation center of the flexible hinge as the rotation center of the lever-like mechanism with respect to the stationary device, the main grid plate mounted on the stationary device and the minor grid plate mounted on the driven portion of the active device are the main grid plate and the minor grid plate of a capacitive angular movement sensor, the flexible hinge comprises at least two supporting spring leaves, each supporting spring leaf is connected to the stationary device at one end, and the other end of the supporting spring leaf is connected to the active device; each supporting spring leaf is vertical to the main grid plate and the minor grid plate; the flexible hinge between the active arm and the stationary arm comprises the intersected supporting spring leaves, the active arm is rotated around the intersection of the supporting spring leaves as the rotation center with respect to the stationary arm, the main grid plate mounted on the stationary arm and the minor grid plate mounted on the driven portion of the active arm are the main grid plate and the minor grid plate of a capacitive angular movement sensor.

Preferably, the hinged portions of the active arm and the stationary arm are parallel with respect to each other in transverse direction, the minor grid plate on the driven portion of the active arm and the main grid plate on the stationary arm are parallel with respect to each other in longitudinal direction above the hinged portions of the active arm and the stationary arm; straight slots in diagonal direction are provided on the upper front portion or lower front portion of the hinged portion of the stationary arm and on the lower front portion or upper front portion of the active arm, and these two slots are vertical to the main grid plate and the minor grid plate; straight slots in diagonal direction are also provided on the lower back portion or upper back portion of the hinged portion of the stationary arm and on the upper back portion or lower back portion of the hinged portion of the active arm, and these two slots are also vertical to the main grid plate and the minor grid plate; the two ends of a supporting spring leaf are inserted in the straight slot on the upper front portion or lower front portion of the hinged portion of the stationary arm and the straight slot on the lower front portion or upper front portion of the hinged portion of the active arm respectively; the two ends of another supporting spring leaf are inserted in the straight slot on the upper back portion or lower back portion of the hinged portion of the stationary arm and the straight slot on the lower back portion or upper back portion of the hinged portion of the active arm respectively; a line passing through the intersection point of the supporting spring leaves and vertical to the main sensor grid plate and minor sensor grid plate is the virtual axis of rotation of the active arm with respect to the stationary arm; a measuring arm inclined towards the stationary arm is connected to the lower portion of the hinged portion of the active arm, a horizontal measuring pin is located at the end of the measuring arm, the hinged portion of the stationary arm is connected with a vertical supporting arm, a cam is mounted on a cam shaft on the end of the vertical supporting arm, the cam shaft is parallel to the measuring pin, and the measuring pin leans on the surface of the cam.

Preferably, the upper and lower ends of the hinged portion of the active arm are both mounted with a horizontal pilot pin, these two horizontal pilot pins are parallel and located in a longitudinal plane, and correspondingly pin holes for receiving the pilot pins 8 are provided on the hinged portion of the stationary arm.

Preferably, horizontal dynamometric springs are connected between the stationary arm and the active arm at positions above and below the two pilot pins.

(2) An adjustable digital caliper, comprises:

a capacitive sensor core with flexible hinge, comprising a main grid plate, a minor grid plate and a mechanism for converting a measurement to a relative movement between the main grid plate and the minor grid plate;

wherein the mechanism comprises a stationary arm and an active arm, the minor grid plate and the main grid plate are respectively mounted on a driven portion of the active arm and the stationary arm, the stationary arm is connected to the active arm by a flexible hinge; the flexible hinge comprises at least two supporting spring leaves, each supporting spring leaf is connected to the stationary arm at one end, and the other end of the supporting spring leaf is connected to the active arm; each supporting spring leaf is vertical to the main grid plate and the minor grid plate; the flexible hinge between the active arm and the stationary arm comprises the intersected supporting spring leaves, the active arm is rotated around the intersection of the supporting spring leaves as the rotation center with respect to the stationary arm, the main grid plate mounted on the stationary arm and the minor grid plate mounted on the driven portion of the active arm are the main grid plate and the minor grid plate of a capacitive angular movement sensor..

Preferably, the hinged portions of the active arm and the stationary arm are parallel with respect to each other in transverse direction, the minor grid plate on the driven portion of the active arm and the main grid plate on the stationary arm are parallel with respect to each other in longitudinal direction above the hinged portions of the active arm and the stationary arm; straight slots in diagonal direction are provided on the upper front portion or lower front portion of the hinged portion of the stationary arm and on the lower front portion or upper front portion of the active arm, and these two slots are vertical to the main grid plate and the minor grid plate; straight slots in diagonal direction are also provided on the lower back portion or upper back portion of the hinged portion of the stationary arm and on the upper back portion or lower back portion of the hinged portion of the active arm, and these two slots are also vertical to the main grid plate and the minor grid plate; the two ends of a supporting spring leaf are inserted in the straight slot on the upper front portion or lower front portion of the hinged portion of the stationary arm and the straight slot on the lower front portion or upper front portion of the hinged portion of the active arm respectively; the two ends of another supporting spring leaf are inserted in the straight slot on the upper back portion or lower back portion of the hinged portion of the stationary arm and the straight slot on the lower back portion or upper back portion of the hinged portion of the active arm respectively; a line passing through the intersection point of the supporting spring leaves and vertical to the main sensor grid plate and minor sensor grid plate is the virtual axis of rotation of the active arm with respect to the stationary arm; the lower portion of the hinged portion of the active arm is connected with a vertical active measuring arm, an open-bottom frame is arranged on the other side of the hinged portion of the stationary arm, two gliding guide bars in parallel are provided in the rectangular frame, pilot holes for respectively receiving the gliding guide bars are provided on the upper end of the vertical stationary measuring arm, a bolt for adjusting measuring range is cooperated with the inner thread on the upper end of the stationary measuring arm, the bolt is of self-locking function, the measuring surface on the lower end of the stationary measuring arm faces and is parallel to the measuring surface on the lower end of the active measuring arm and is vertical to the main grid plate and the minor grid plate.

Preferably, the upper end of the hinged portion and the lower end of the stationary arm are provided with at least one horizontal pilot pin, the pilot pin is inserted into a corresponding pin hole on the active arm.

Preferably, a dynamometric spring is provided horizontally above the pilot pin and below the main grid plate, the dynamometric spring leans on the active arm.

Preferably, the active arm is further mounted horizontally with a lifting screw above the dynamometric spring and below the minor grid plate.

Preferably, the measuring surface of the active measuring arm is further provided with a cylindrical measuring head that is capable to swing slightly.

(3) A lever gauge, comprises:

a capacitive sensor core with flexible hinge, comprising a main grid plate, a minor grid plate and a mechanism for converting a measurement to a relative movement between the main grid plate and the minor grid plate;

wherein the mechanism comprises a stationary device and an active device, the minor grid plate and the main grid plate are respectively mounted on a driven portion of the active device and the stationary device, the stationary device is connected to the active device by a flexible hinge; the stationary device is a stationary frame, the active device is an active arm, the stationary frame is disposed vertically, the active arm is disposed vertically inside the stationary frame, the minor grid plate mounted on the driven portion of the active arm and the main grid plate mounted in the stationary frame are parallel in longitudinal direction; a seat for the supporting spring leaf is provided on the lower end of the active arm outside the stationary frame; an inclined straight slot is provided on the bottom of the stationary frame on the left side of the opening, and an inclined straight slot is provided on the top left portion of the seat, and these two straight slots are vertical to the main grid plate and the minor grid plate; an inclined straight slot is provided on the bottom of the stationary frame on the right side of the opening, and an inclined straight slot is provided on the top right portion of the seat, and these two straight slots are vertical to the main grid plate and the minor grid plate; the two ends of the two supporting spring leaves are respectively inserted in the straight slots on the stationary frame and the straight slots on the seat, the obliquity of the two supporting spring leaves which intersect inside the seat is identical, and the intersecting line of the two supporting spring leaves is vertical to the main grid plate and the minor grid plate and is the virtual rotation axis of the active arm with respect to the stationary frame; the seat is further hinged with a base for the measuring head, the bottom of the base is connected to the measuring stick having a spherical head.

Preferably, the base is hinged to the seat. An orientation wheel for the active arm is mounted in the stationary frame, the orientation wheel is of a groove for movably receiving the active arm, and the direction of the groove on the orientation wheel is the same as the swinging direction of the active arm.

Preferably, a pressing plate that is rotated around a shaft is further mounted inside the stationary frame, a pin on the upper end of the pressing plate and a pin on the lower end of the pressing plate lean on the two sides of the active arm respectively, an end of a measuring spring is connected to the pin on one side of the active arm, and the other end of the measuring spring is connected to the inner surface of the stationary frame on the other side of the active arm. Positioning cams at an upper left position and another lower right position are arranged respectively on the two sides of the longitudinal portion of the active arm, and contacted with the outer edge of the pressing plate.

2. The flexible hinge between the active arm and the stationary arm comprises the supporting spring leaves that are symmetrically arranged, the active arm performs linear movement with respect to the stationary arm according to the symmetry central line of the supporting spring leaves, the main grid plate mounted on the stationary arm and the minor grid plate mounted on the driven portion of the active arm are the main grid plate and the minor grid plate of a linear displacement capacitive sensor.

Measuring device utilizing the linear displacement capacitive sensor core with flexible hinge may be as follows:

A micrometer, comprises:

a capacitive sensor core with flexible hinge, comprising a main grid plate, a minor grid plate and a mechanism for converting a measurement to a relative movement between the main grid plate and the minor grid plate;

wherein the mechanism comprises a stationary device and an active device, the minor grid plate and the main grid plate are respectively mounted on a driven portion of the active device and the stationary device, the stationary device is connected to the active device by a flexible hinge; the flexible hinge comprises at least two supporting spring leaves, each supporting spring leaf is connected to the stationary device at one end, and the other end of the supporting spring leaf is connected to the active device; each supporting spring leaf is vertical to the main grid plate and the minor grid plate; the active device performs a straight-line reciprocating movement up and down with respect to the stationary device, the main grid plate and the minor grid plate respectively mounted on the stationary device and the active device are the main grid plate and the minor grid plate of a linear displacement capacitive sensor.

Preferably, the active device is connected to the stationary device via the flexible hinge, and performs linear movement with respect to the stationary device according to the symmetry central line of the flexible hinge.

Preferably, the supporting spring leaf is of an angled shape or arc shape, and located symmetrically on the two sides of the active device.

Preferably, the stationary device and the active device are a circular casing and an active arm respectively, the main grid plate is mounted in the center of the circular casing, the bottom of the circular casing behind the main grid plate is mounted with a vertical guide sleeve, the pilot pin is received in the guide sleeve and the two ends of the pilot pin are exposed out of the guide sleeve, the active device is connected to the stationary device via the flexible hinge, the pilot pin and the guide sleeve form a guide device which performs linear movement with respect to the circular casing according to the symmetry central line of the flexible hinge, the front surface of the main grid plate is mounted with the vertical active arm, a minor grid plate 4 is mounted on a surface of the active arm facing the main grid plate, the upper end of the active arm is connected to the upper end of the pilot pin via transverse connecting element; a straight slot inclined towards the bottom left side is provided on the left side of the body below the main grid plate, a straight slot inclined towards the bottom right side from outside to inside is provided on the right side of the body below the main grid plate; a straight slot inclined towards the top right side is provided on the left side of the connecting element, a straight slot inclined towards the top left side is provided on the right side of the connecting piece, all the straight slots are vertical to the main grid plate and the minor grid plate; angled supporting spring leaves are provided on the two sides of the main grid plate, the two ends of each supporting spring leaf are inserted to the straight slots on the connecting element and the main grid plate on the same side, the two supporting spring leaves form a rhombus, the lower end of the active arm is connected vertically with a measuring stick and the measuring stick extends through a mounting hole on the bottom of the circular casing and is exposed out of the circular casing, and the measuring stick has a tapered measuring head on the end.

Preferably, each supporting spring leaf is broken at the folded position where a left sliding piece and a right sliding piece are arranged, the supporting spring leaves are received in the straight slots on the left and right sliding pieces.

Preferably, a lower sleeve is mounted on the measuring stick; the upper end of the lower sleeve is mounted in the mounting hole on the bottom of the circular casing.

In the capacitive sensor core with flexible hinge, the angular displacement sensor, the adjustable digital display caliper, the lever gauge and the micrometer, two pairs of the main grid plate and the minor grid plate are mounted on the stationary arm and the active arm, one pair is the main grid plate and the minor grid plate of a calibration sensor, and ½ pitch of the calibration sensor is the measuring range, and the other pair is the main grid plate and the minor grid plate of a measuring sensor.

Advantages of the present invention are as follows:

1. the supporting point of the lever is a flexible element, which ensures no clearance, no friction, free lubricant, high precision and high stability of movement transmission, and accidental error will not occur in the measuring system;

2. the main grid pate and the minor grid plate of the capacitive sensor are mounted on the active arm and the stationary arm, which is of a very simple structure;

3. the distinguish rate and measuring precision of the sensor may be improved conveniently by changing the lever ratio of the lever;

4. the output data of the sensor may be transmitted to the computer which may correct the measuring error and set the functions conveniently.

1: stationary arm; 1-1: stationary frame; 1-2: circular casing; 2: active arm; 3: main grid plate; 4 minor grid plate; 5 dynamometric spring; 6 gliding guide bar; 7 supporting spring leaf; 8 pilot pin; 9 measuring pin; 10 lifting screw; 11 bolt for adjusting measuring range; 12 cam; 13 cylindrical measuring head; 14 seat for the supporting spring leaf; 15 base for the measuring head; 16 measuring stick; 17 stationary measuring arm; 18 orientation wheel for the active arm; 19 pressing plate; 20 pin; 21 positioning cam; 22 guide pin; 23 sliding piece; 24 lower sleeve.

DETAILED DESCRIPTION OF THE PREFERRED EMBODIMENT

Figure 1:
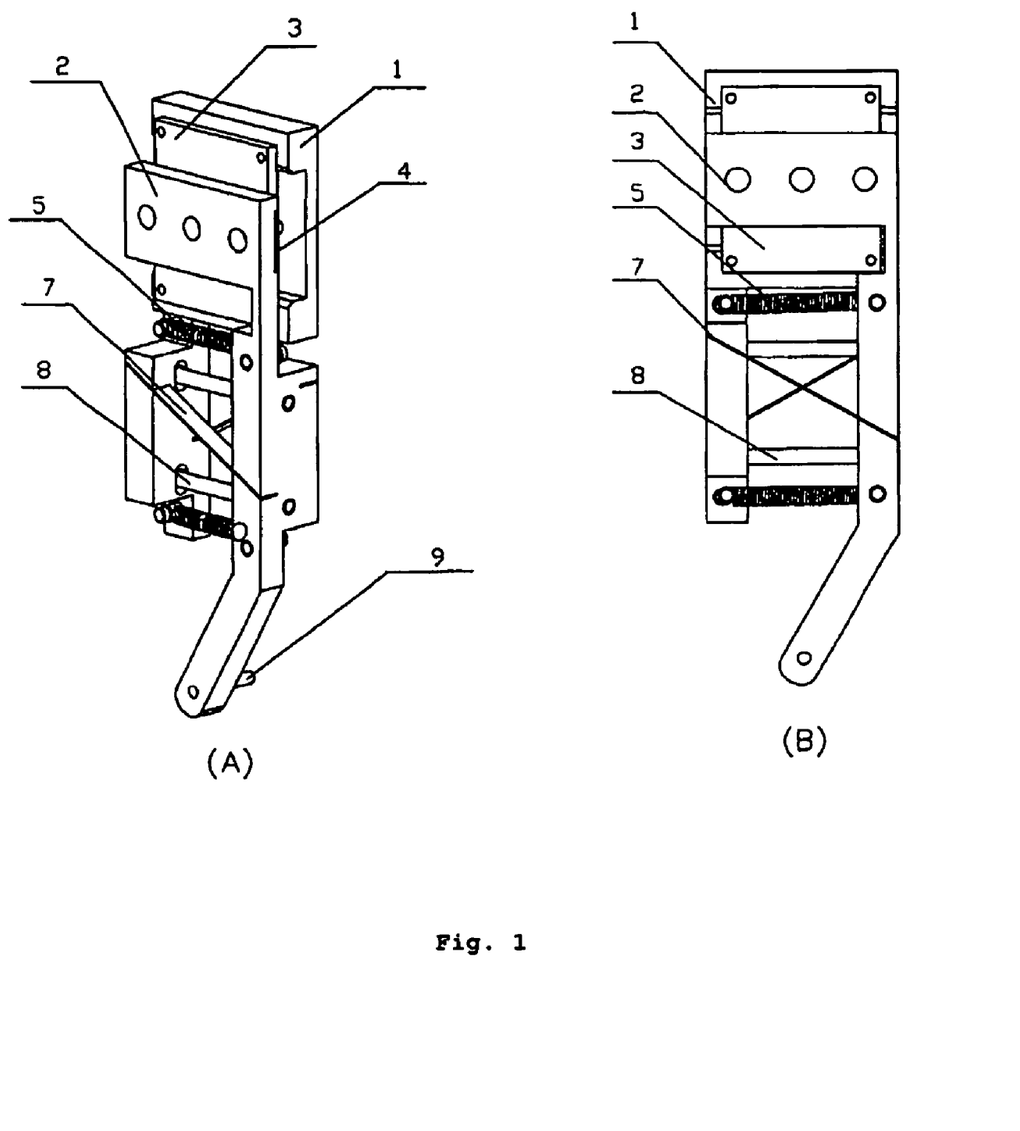
FIG. 1A is a schematic view of a capacitive sensor core with flexible hinge according to an embodiment of the present invention.
FIG. 1B is a front view of the capacitive sensor shown in FIG. 1A.

A first embodiment of a capacitive sensor core with flexible hinge is shown in FIG. 1. In the capacitive sensor core with flexible hinge, the stationary device is a stationary arm 1, and the active device is an active arm 2. The stationary arm 1 comprises a hinged portion on the horizontal position and a driven portion on the vertical position. The driven portion is connected to the rear portion of the top of the hinged portion by a vertical rod. The active arm 2 comprises a hinged portion on the horizontal position and a driven portion on the vertical position. The driven portion is connected to the front portion of the top of the hinged portion. During the assembling of the capacitive sensor core, the hinged portion of the stationary arm is mounted oppositely with respect to the hinged portion of the active arm, while the driven portion of the stationary arm is also mounted oppositely with respect to the driven portion of the active arm. The driven portion of the stationary arm is mounted with a main grid plate 3, and the driven portion of the active arm is mounted with a minor grid plate 4. The lower portion of the front of the hinged portion of the active arm is connected to the measuring stick that is oblique towards the hinged portion of the stationary arm, and the measuring stick is provided with a measuring pin 9 at its end on the horizontal position.

The hinged portion of the stationary arm and the corresponding hinged portion of the active arm are connected with each other by intersected supporting spring leaves 7, the detailed connection way of which is as follows:

A straight slot that is inclined towards the top left side from outside to inside is provided on the top of the front of the hinged portion of the stationary arm. The straight slot is vertical to the main grid plate 3 and the minor grid plate 4. A straight slot that is inclined towards the bottom right side from outside to inside is provided on the bottom of the front of the hinged portion of the active arm, this straight slot is also vertical to the main grid plate 3 and the minor grid plate 4, and the straight slot on the hinged portion of the stationary arm and the straight slot on the hinged portion of the active arm are on the same diagonal line. The two ends of a supporting spring leaf are inserted in the above two straight slots respectively which ensure the supporting spring leaf 7 to be vertical to the main grid plate 3 and the minor grid plate 4.

A straight slot that is inclined towards the bottom left side from outside to inside is provided on the bottom of the back of the hinged portion of the stationary arm, and the straight slot is vertical to the main grid plate 3 and the minor grid plate 4. A straight slot that is inclined towards the top right side from outside to inside is provided on the top of the back of the hinged portion of the active arm, and this straight slot is also vertical to the main grid plate 3 and the minor grid plate 4, and the straight slot on the hinged portion of the stationary arm and the straight slot on the hinged portion of the active arm are on the same diagonal line. The two ends of another supporting spring leaf are inserted in the above two straight slots respectively which ensure the supporting spring leaf 7 to be vertical to the main grid plate 3 and the minor grid plate 4.

The supporting spring leaves 7 which are on two different planes are intersectingly connected to the stationary arm 1 and the active arm 2 and form flexible hinge levers, and a line passing through the intersection point of the supporting spring leaves 7 and vertical to the main sensor grid plate 3 and minor sensor grid plate 4 is the virtual axis of rotation of the active arm 2 with respect to the stationary arm 1.

The upper and lower ends of the middle portion of the hinged portion of the active arm are both mounted with a horizontal pilot pin 8. These two horizontal pilot pins 8 are located in a longitudinal plane, and correspondingly pin holes for receiving the pilot pins 8 are provided on the hinged portion of the stationary arm. A horizontal dynamometric spring 5 is connected between the hinged portion of the stationary arm and the vertical rod on the top of the hinged portion of the active arm. Similarly, a horizontal dynamometric spring 5 is connected between the hinged portion of the stationary arm and the vertical rod on the bottom of the hinged portion of the active arm.

Figure 2:
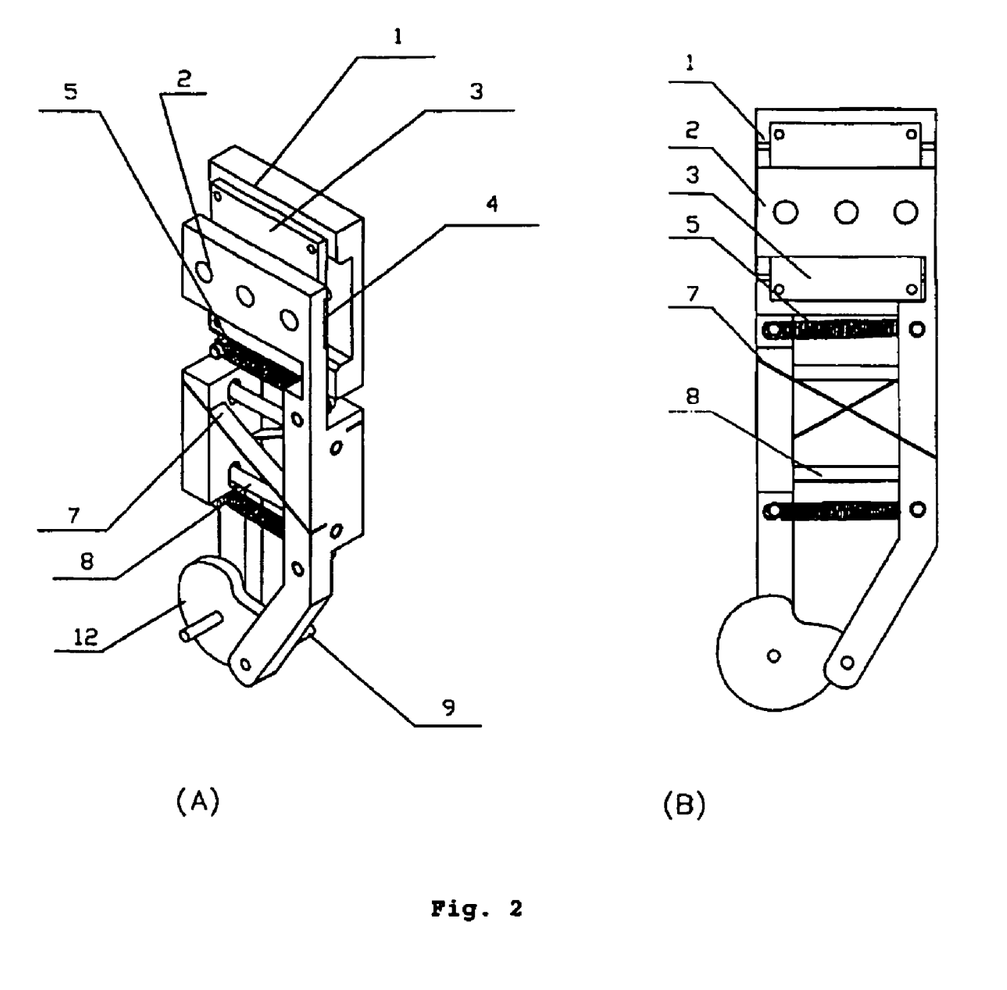
FIG. 2A is a schematic view of a capacitive angular movement sensor with flexible hinge according to an embodiment of the present invention.
FIG. 2B is a front view of the sensor shown in FIG. 2B.

As a second embodiment, a capacitive angular movement sensor with flexible hinge utilizes the capacitive sensor core with flexible hinge shown in FIG. 1. Referring to FIG. 2, in the capacitive angular movement sensor, a cam 12 is mounted on the capacitive sensor core with flexible hinge as shown in FIG. 1, wherein the vertical rod of the hinged portion of the stationary arm is extended, and a pin that is at the same horizontal line as the measuring pin 9 on the measuring stick of the hinged portion of the active arm is provided horizontally on the end of the vertical rod. The cam 12 is mounted on the pin on the end of the vertical rod, and the measuring pin 9 leans on the surface of the cam 12.

Figure 3:
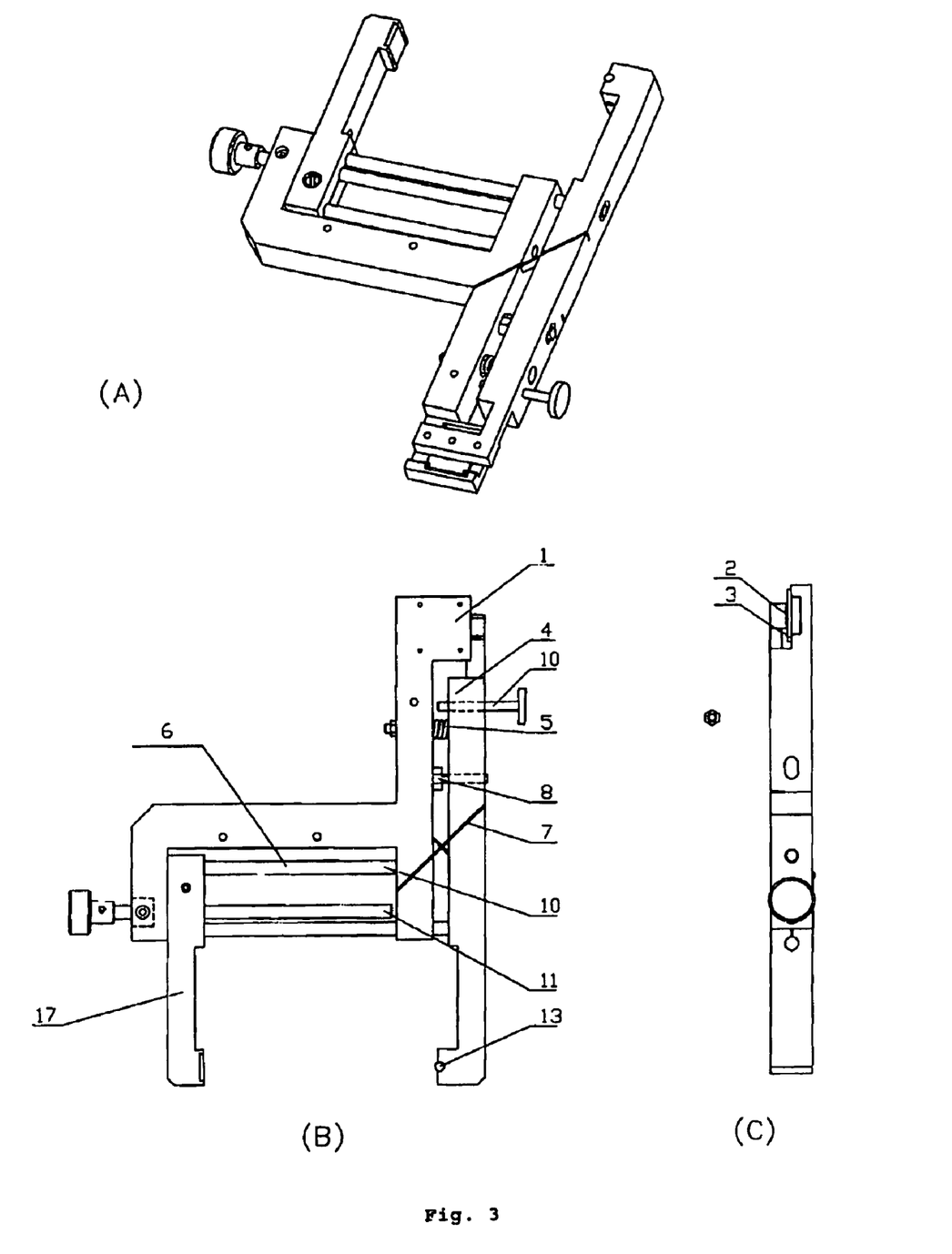
FIG. 3A is a schematic view of an adjustable digital caliper according to an embodiment of the present invention.
FIG. 3B is a front view of the adjustable digital caliper shown in FIG. 3A.
FIG. 3C is a left view of the adjustable digital caliper shown in FIG. 3B.

A third embodiment is an adjustable digital caliper which also utilizes the capacitive sensor core with flexible hinge as shown in FIG. 1. As shown in FIG. 3, the stationary device and the active device are a bar-like stationary arm 1 and a bar-like active arm 2 respectively. The stationary arm 1 comprises a hinged portion on the horizontal position and a driven portion on the vertical position. The driven portion of the stationary arm is connected to the front portion of the top of the hinged portion of the stationary arm. The active arm 2 comprises a hinged portion on the horizontal position and a driven portion on the vertical position. The driven portion of the active arm is connected to the back portion of the top of the hinged portion of the active arm. During the assembling of the adjustable digital caliper, the hinged portion of the stationary arm is mounted oppositely with respect to the hinged portion of the active arm, while the driven portion of the stationary arm is also mounted oppositely with respect to the driven portion of the active arm. The driven portion of the stationary arm is mounted with a main grid plate 3, and the driven portion of the active arm is mounted with a minor grid plate 4. The lower portion of the hinged portion of the active arm is connected with a vertical active measuring arm.

The hinged portion of the stationary arm and the corresponding hinged portion of the active arm are connected with each other by intersected supporting spring leaves 7, the detailed connection way of which is as follows:

A straight slot that is inclined towards the bottom left side from outside to inside is provided on the lower front portion of the hinged portion of the stationary arm, and this straight slot is vertical to the main grid plate 3 and the minor grid plate 4. A straight slot that is inclined towards the top right side from outside to inside is provided on the top of the front of the hinged portion of the active arm, this straight slot is also vertical to the main grid plate 3 and the minor grid plate 4. These two straight slots are on the same diagonal line. The two ends of a supporting spring leaf 7 are inserted in the above two straight slots respectively, and the supporting spring leaf 7 is vertical to the main grid plate 3 and the minor grid plate 4 after assembling.

A straight slot that is inclined towards the top left side from outside to inside is provided on the top of the back of the hinged portion of the stationary arm 1, and the straight slot is vertical to the main grid plate 3 and the minor grid plate 4. A straight slot that is inclined towards the bottom right side from outside to inside is provided on the lower portion of the back of the hinged portion of the active arm 2, and this straight slot is also vertical to the main grid plate 3 and the minor grid plate 4. These two straight slots are on the same diagonal line. The two ends of another supporting spring leaf 7 are inserted in the above two straight slots respectively, and the supporting spring leaf 7 is vertical to the main grid plate 3 and the minor grid plate 4 after assembling.

The supporting spring leaves 7 which are on two different planes are intersectingly connected to the stationary arm 1 and the active arm 2 respectively and form flexible hinge levers, and a line passing through the intersection point of the supporting spring leaves 7 and vertical to the main sensor grid plate 3 and minor sensor grid plate 4 is the virtual axis of rotation of the active arm 2 with respect to the stationary arm 1.

An L-shaped bracket is connected to the outer side of the hinged portion of the stationary arm, and an open-bottom rectangular frame is formed by the L-shaped bracket and the hinged portion of the stationary arm. Two gliding guide bars 6 in parallel are provided in the rectangular frame. Pilot holes for respectively receiving the gliding guide bars 6 are provided on the upper end of the vertical stationary measuring arm 17, and the measuring surface on the lower end of the stationary measuring arm 17 faces to the measuring surface on the lower end of the active measuring arm. A bolt for adjusting measuring range 11 is further provided between the two gliding guide bars 6. The bolt for adjusting measuring range 11 extends horizontally into the rectangular frame from outside, and cooperates with the threaded hole in the upper end of the stationary measuring arm 17. A locking screw is mounted on the rectangular frame, and after the stationary measuring arm 17 is moved to a desired position, the bolt for adjusting measuring range 11 can be locked by the locking screw to stop rotating, so that the stationary measuring arm 17 is locked in position.

An end of the lower gliding guide bar 6 travels through the hinged portion of the stationary arm and then is received in the pilot hole on the hinged portion of the active arm. The position of the pilot hole for receiving the gliding guide bar 6 is lower than the positions of intersected supporting spring leaves 7. Another pilot pin 8 is provided horizontally on the stationary arm 1 at a position higher than the positions of the intersected supporting spring leaves 7. The pilot pin 8 extends into a corresponding pilot hole on the active arm 2. The stationary arm 1 is further provided horizontally with a dynamometric spring 5 above the pilot pin 8, and another end of the dynamometric spring 5 leans against the opposite active arm 2. The active arm 2 is further mounted horizontally with a lifting screw 10 above the dynamometric spring 5. The measuring surface of the active measuring arm is further provided with a cylindrical measuring head 13 that is capable to swing slightly on the supporting shaft.

Figure 4:
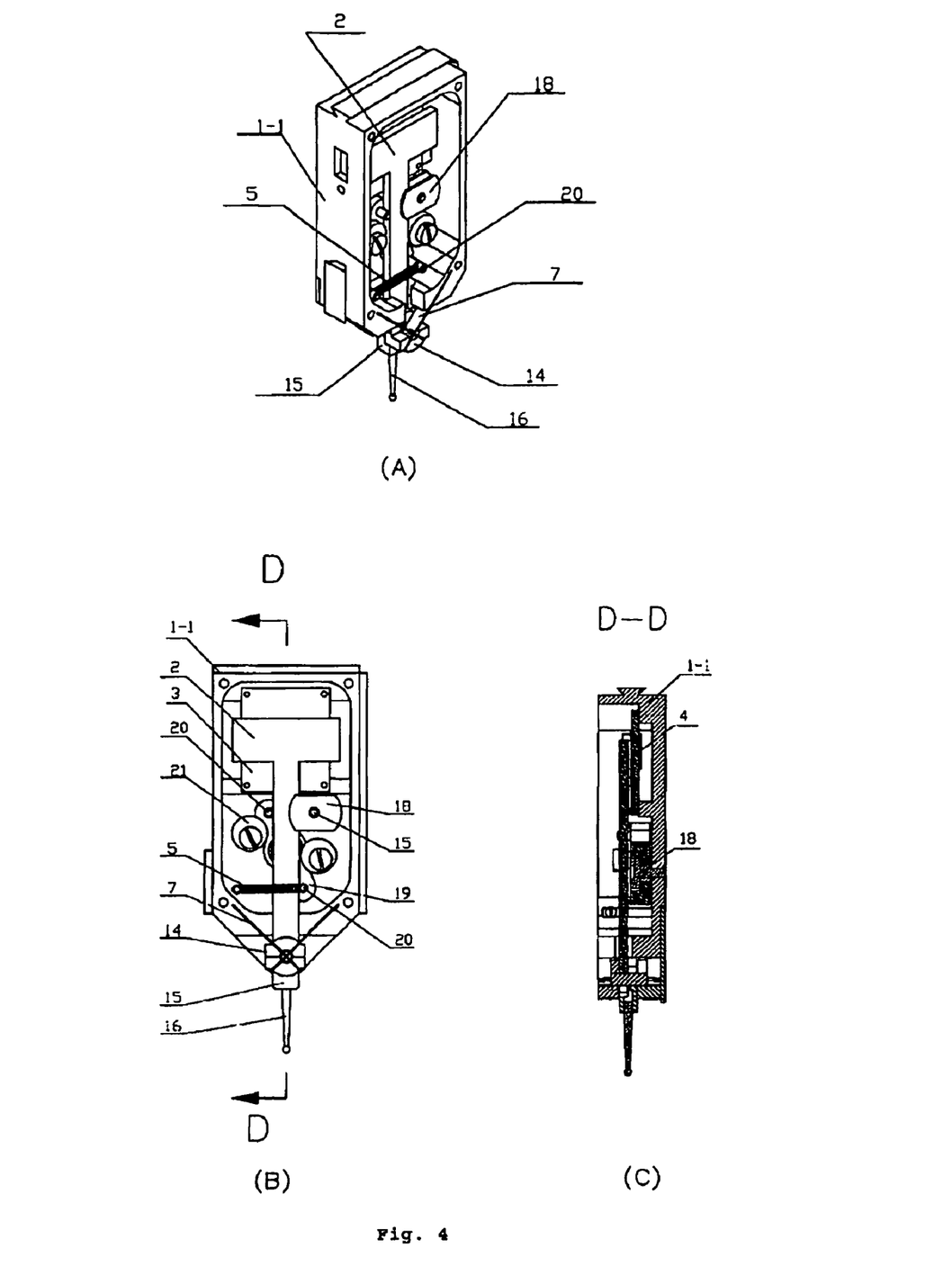
FIG. 4A is a schematic view of a lever gauge according to an embodiment of the present invention.
FIG. 4B is a front view of the lever gauge shown in FIG. 4A.
FIG. 4C is a sectional view of the lever gauge shown in FIG. 4B taking along the line D-D.

A fourth embodiment is a lever gauge which also utilizes the capacitive sensor core with flexible hinge. As shown in FIG. 4, the stationary device and the active device are a stationary frame 1-1 and a T-shaped active arm 2 respectively. The stationary frame 1-1 is provided with an opening on the bottom, and the longitudinal portion of the active arm 2 is mounted vertically in the stationary frame 1-1, and its lower end is exposed out of the opening on the bottom of the stationary frame 1-1, and the transverse portion on the upper end of the active arm 2 faces to the main grid plate 3 in the stationary frame 1-1. The minor grid plate 4 corresponding to the main grid plate 3 is mounted on the transverse portion on the upper end of the active arm 2. A straight slot which is inclined towards top left side and a straight slot which is inclined towards top right side are provided on two sides of the opening of the bottom of stationary frame 1-1 respectively. The straight slots which have the same gradient are vertical to the main grid plate 3 and the minor grid plate 4. A seat 14 for the supporting spring leaf is provided on the end of the longitudinal portion of the active arm 2 outside the stationary frame 1-1. Two straight slots corresponding to the gradient of the above two straight slots are provided on the left and right sides of the seat 14, and these two straight slots are also vertical to the main grid plate 3 and the minor grid plate 4, and have the same gradient as the above two straight slots.

Two ends of two supporting spring leaves 7 which are arranged in one plane are respectively inserted into the straight slots corresponding to the seat 14, and form an intersection within the seat 14, and the intersecting line of the supporting spring leaves 7 are vertical to the main grid plate 3 and the minor grid plate 4. The intersecting line is the virtual rotation axis of the stationary frame 1-1. The seat 14 is further hinged with a base 15 for the measuring head; the bottom of the base 15 is connected to the measuring stick 16 which is of a spherical head.

An orientation wheel 18 for the active arm is mounted in the stationary frame 1-1 via supporting shaft, and located on the right side of the longitudinal portion of the active arm 2. The orientation wheel 8 is of a groove for movably receiving the longitudinal portion of the active arm 2.

A pressing plate 19 that is rotated around a shaft is further mounted inside the stationary frame 1-1, and located behind the longitudinal portion of the active arm 2. A pin on the upper end of the pressing plate 19 and a stress application spring pin on the lower end of the pressing plate 19 lean on the two sides of the longitudinal portion of the active arm 2 respectively. An end of a measuring spring 5 is connected to the pin 20 on the lower end of the pressing plate 19, and the other end of the measuring spring 5 is connected to the inner surface of the stationary frame 1-1 at the left side of the longitudinal portion of the active arm 2, in order to maintain the measuring spring 5 to be horizontal. Positioning cams 21 at an upper left position and another lower right position are arranged respectively on the two sides of the longitudinal portion of the active arm 2, and contacted with the outer edge of the pressing plate 19.

Figure 5:
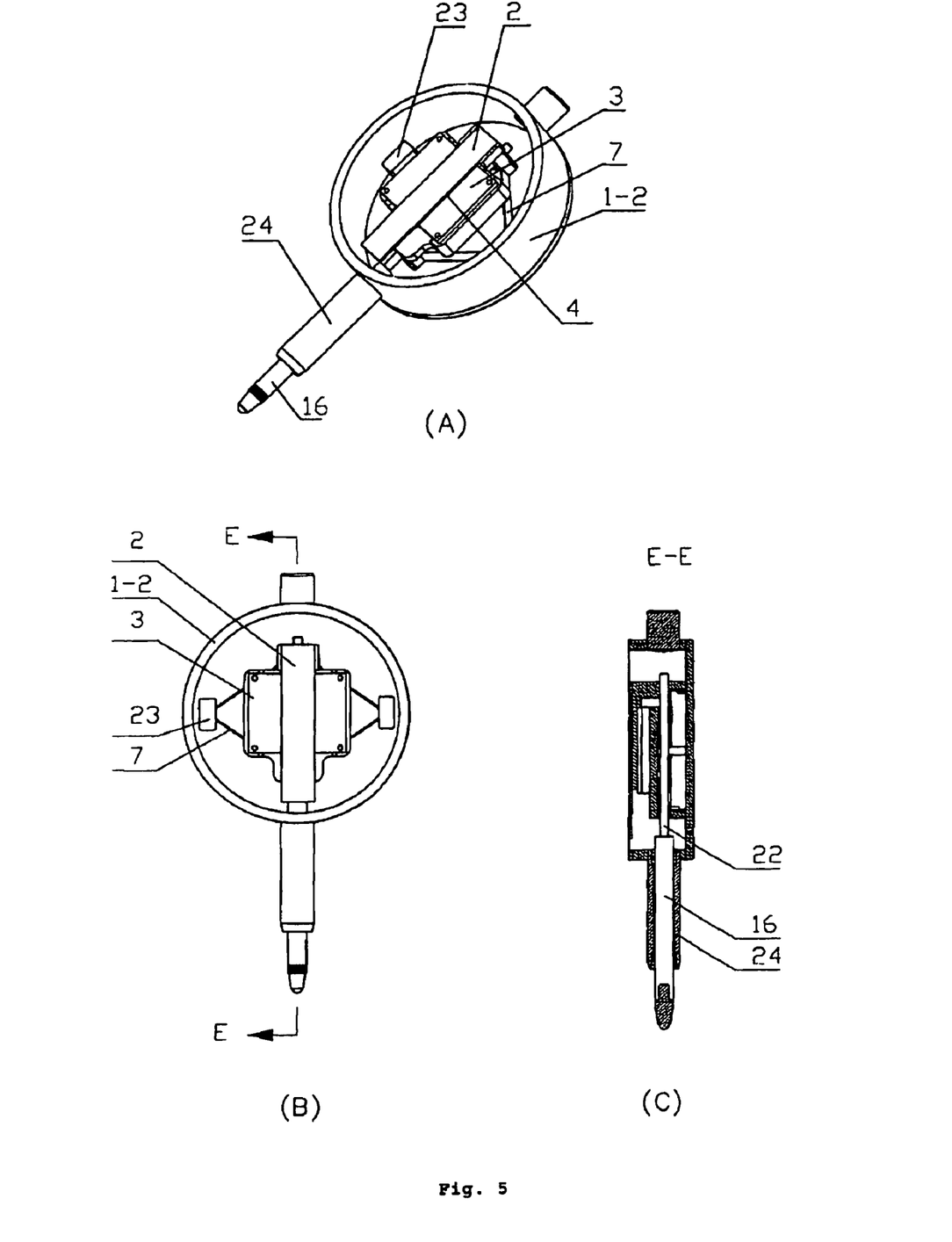
FIG. 5A is a schematic view of a micrometer according to an embodiment of the present invention.
FIG. 5B is a front view of the micrometer shown in FIG. 4A.
FIG. 5C is a sectional view of the micrometer shown in FIG. 5B taking along the line E-E.

A fifth embodiment is a micrometer which also utilizes the capacitive sensor core with flexible hinge. As shown in FIG. 5, the stationary device and the active device are a circular casing 1-2 and a bar-like active arm 2 respectively. A rectangular main grid plate 3 is mounted inside the circular casing 1-2. The front surface of the main grid plate 3 is mounted with the vertical active arm 2. A minor grid plate 4 is mounted on a surface of the active arm 2 facing the main grid plate 3. The bottom of the circular casing 1-2 behind the main grid plate 3 is mounted with a vertical guide sleeve, the pilot pin 22 is received in the guide sleeve and the two ends of the pilot pin 22 are exposed out of the guide sleeve. The upper end of the active arm 2 is connected to the upper end of the pilot pin 22 via transverse connecting element. The lower end of the active arm 2 is connected vertically with a measuring stick 16, and the measuring stick 16 extends through a mounting hole on the bottom of the circular casing 1-2 and is exposed out of the circular casing 1-2. The measuring stick 16 has a tapered measuring head on its end.

A left sliding piece 23 and a right sliding piece 23 are arranged equidistantly on the two sides of the main grid plate 3. A straight slot inclined towards the bottom left side and a straight slot inclined towards the bottom right side from outside to inside are provided respectively on the two lower sides of the body below the main grid plate 3, and these straight slots are vertical to the main grid plate 3 and the minor grid plate 4. A straight slot inclined towards the top left side and a straight slot inclined towards the top right side from outside to inside are provided respectively on the two upper sides of the connecting piece on the top of the active arm 2. Two pairs of intersected straight slots are respectively provided in the left and right sliding piece 23, and these straight slots are respectively corresponding to the straight slots on the body and the connecting piece below the main grid plate 3. The ends of four supporting spring leaves 7 are received in the above straight slots, and are in the same plane and vertical to the main grid plate 3 and the minor grid plate 4, and form a rhombus.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A capacitive sensor core with flexible hinge, comprising:
  a main grid plate;
  a minor grid plate; and
  a mechanism for converting a measurement to a relative displacement between the main grid plate and the minor grid plate;
  wherein the mechanism comprises a stationary arm (1) and an active arm, the minor grid plate (4) and the main grid plate (3) are respectively mounted on a driven portion of the active arm and the stationary arm, the stationary arm is connected to the active arm by a flexible hinge; the flexible hinge comprises at least two supporting spring leaves (7), each supporting spring leaf (7) is connected to the stationary arm at one end, and the other end of the supporting spring leaf (7) is connected to the active arm; each supporting spring leaf (7) is vertical to the main grid plate (3) and the minor grid plate (4); and
  the flexible hinge between the active arm (2) and the stationary arm (1) comprises the intersected supporting spring leaves (7), the active arm (2) is rotated around the intersection of the supporting spring leaves (7) as the rotation center with respect to the stationary arm (1), the main grid plate (3) mounted on the stationary arm (1) and the minor grid plate (4) mounted on the driven portion of the active arm (2) are the main grid plate (3) and the minor grid plate (4) of a capacitive angular movement sensor; or
  the flexible hinge between the active arm (2) and the stationary arm (1) comprises the supporting spring leaves (7) that are symmetrically arranged, the active arm (2) performs linear movement with respect to the stationary arm (1) according to the symmetry central line of the supporting spring leaves (7), the main grid plate (3) mounted on the stationary arm (1) and the minor grid plate (4) mounted on the driven portion of the active arm (2) are the main grid plate (3) and the minor grid plate (4) of a linear displacement capacitive sensor.

2. The capacitive sensor core with flexible hinge of claim 1, wherein the hinged portions of the active arm (2) and the stationary arm (1) are parallel with respect to each other in transverse direction, the minor grid plate (4) on the driven portion of the active arm (2) and the main grid plate (3) on the stationary arm (1) are parallel with respect to each other in longitudinal direction above the hinged portions of the active arm (2) and the stationary arm (1); straight slots in diagonal direction are provided on the lower front portion or upper front portion of the hinged portion of the stationary arm (1) and on the upper front portion or lower front portion of the active arm (2), and these two slots are vertical to the main grid plate (3) and the minor grid plate (4); straight slots in diagonal direction are also provided on the lower back portion or upper back portion of the hinged portion of the stationary arm (1) and on the upper back portion or lower back portion of the hinged portion of the active arm (2), and these two slots are also vertical to the main grid plate (3) and the minor grid plate (4); the two ends of a supporting spring leaf (7) are respectively inserted in the straight slot on the upper front portion or lower front portion of the hinged portion of the stationary arm (1) and the straight slot on the lower front portion or upper front portion of the hinged portion of the active arm (2); the two ends of another supporting spring leaf (7) are respectively inserted in the straight slot on the upper back portion or lower back portion of the hinged portion of the stationary arm (1) and the straight slot on the lower back portion or upper back portion of the hinged portion of the active arm (2); a line passing through the intersection point of the supporting spring leaves (7) and vertical to the main sensor grid plate (3) and minor sensor grid plate (4) is the virtual axis of rotation of the active arm (2) with respect to the stationary arm (1).

3. The capacitive sensor core with flexible hinge of claim 2, wherein the upper and lower ends of the hinged portion of the active arm (2) are both mounted with a horizontal pilot pin (8), these two horizontal pilot pins (8) are parallel and located in a longitudinal plane, and correspondingly pin holes for receiving the pilot pins (8) are provided on the hinged portion of the stationary arm (1).

4. The capacitive sensor core with flexible hinge of claim 3, wherein horizontal dynamometric springs (5) are connected between the stationary arm (1) and the active arm (2) at positions above and below the two pilot pins (8).

5. The capacitive sensor core with flexible hinge of claim 1, wherein the supporting spring leaf (7) is of an angled shape or arc shape, and located symmetrically on the two sides of the active arm.

6. The capacitive sensor core with flexible hinge of claim 1, wherein two pairs of the main grid plate (3) and the minor grid plate (4) are mounted on the stationary arm (1) and the active arm (2), one pair is the main grid plate and the minor grid plate of a calibration sensor, and ½ pitch of the calibration sensor is the measuring range, and the other pair is the main grid plate and the minor grid plate of a measuring sensor.

7. A capacitive angular movement sensor, comprising:
a capacitive sensor core with flexible hinge, comprising a main grid plate (3), a minor grid plate (4) and a mechanism for converting a measurement to a relative movement between the main grid plate and the minor grid plate;
wherein the mechanism comprises a stationary arm and an active arm, the minor grid plate (4) and the main grid plate (3) are respectively mounted on a driven portion of the active arm and the stationary arm, the stationary arm is connected to the active arm by a flexible hinge; the active arm is mounted on the stationary arm via the flexible hinge that is used as supporting arm to form a lever-like mechanism, the active arm is rotated around the rotation center of the flexible hinge as the rotation center of the lever-like mechanism with respect to the stationary arm, the main grid plate (3) mounted on the stationary arm and the minor grid plate (4) mounted on the driven portion of the active arm are the main grid plate (3) and the minor grid plate (4) of a capacitive angular movement sensor, the flexible hinge comprises at least two supporting spring leaves (7), each supporting spring leaf (7) is connected to the stationary arm at one end, and the other end of the supporting spring leaf (7) is connected to the active arm; each supporting spring leaf (7) is vertical to the main grid plate (3) and the minor grid plate (4).

8. The capacitive angular movement sensor of claim 7, wherein the hinged portions of the active arm (2) and the stationary arm (1) are parallel with respect to each other in transverse direction, the minor grid plate (4) on the driven portion of the active arm (2) and the main grid plate (3) on the stationary arm (1) are parallel with respect to each other in longitudinal direction above the hinged portions of the active arm (2) and the stationary arm (1); straight slots in diagonal direction are provided on the upper front portion or lower front portion of the hinged portion of the stationary arm (1) and on the lower front portion or upper front portion of the active arm (2), and these two slots are vertical to the main grid plate (3) and the minor grid plate (4); straight slots in diagonal direction are also provided on the lower back portion or upper back portion of the hinged portion of the stationary arm (1) and on the upper back portion or lower back portion of the hinged portion of the active arm (2), and these two slots are also vertical to the main grid plate (3) and the minor grid plate (4); the two ends of a supporting spring leaf (7) are inserted in the straight slot on the upper front portion or lower front portion of the hinged portion of the stationary arm (1) and the straight slot on the lower front portion or upper front portion of the hinged portion of the active arm (2) respectively; the two ends of another supporting spring leaf (7) are inserted in the straight slot on the upper back portion or lower back portion of the hinged portion of the stationary arm (1) and the straight slot on the lower back portion or upper back portion of the hinged portion of the active arm (2) respectively; a line passing through the intersection point of the supporting spring leaves (7) and vertical to the main sensor grid plate (3) and minor sensor grid plate (4) is the virtual axis of rotation of the active arm (2) with respect to the stationary arm (1); a measuring arm inclined towards the stationary arm (1) is connected to the lower portion of the hinged portion of the active arm (2), a horizontal measuring pin (9) is located at the end of the measuring arm, the hinged portion of the stationary arm (1) is connected with a vertical supporting arm, a cam (12) is mounted on a cam shaft on the end of the vertical supporting arm, the cam shaft is parallel to the measuring pin (9), and the measuring pin (9) leans on the surface of the cam (12).

9. The capacitive angular movement sensor of claim 8, wherein the upper and lower ends of the hinged portion of the active arm (2) are both mounted with a horizontal pilot pin (8), these two horizontal pilot pins (8) are parallel and located in a longitudinal plane, and correspondingly pin holes for receiving the pilot pins (8) are provided on the hinged portion of the stationary arm (1).

10. The capacitive angular movement sensor of claim 9, wherein horizontal dynamometric springs (5) are connected between the stationary arm (1) and the active arm (2) at positions above and below the two pilot pins (8).

11. The capacitive angular movement sensor according to claim 7, wherein two pairs of the main grid plate (3) and the minor grid plate (4) are mounted on the stationary arm (1) and the active arm (2), one pair is the main grid plate and the minor grid plate of a calibration sensor, and ½ pitch of the calibration sensor is the measuring range, and the other pair is the main grid plate and the minor grid plate of a measuring sensor.

12. An adjustable digital caliper, comprising:
a capacitive sensor core with flexible hinge, comprising a main grid plate (3), a minor grid plate (4) and a mechanism for converting a measurement to a relative movement between the main grid plate and the minor grid plate;

wherein the mechanism comprises a stationary arm and an active arm, the minor grid plate (4) and the main grid plate (3) are respectively mounted on a driven portion of the active arm and the stationary arm, the stationary arm is connected to the active arm by a flexible hinge; the flexible hinge comprises at least two supporting spring leaves (7), each supporting spring leaf (7) is connected to the stationary arm at one end, and the other end of the supporting spring leaf (7) is connected to the active arm; each supporting spring leaf (7) is vertical to the main grid plate (3) and the minor grid plate (4); the flexible hinge between the active arm (2) and the stationary arm (1) comprises the intersected supporting spring leaves (7), the active arm (2) is rotated around the intersection of the supporting spring leaves (7) as the rotation center with respect to the stationary arm (1), the main grid plate (3) mounted on the stationary arm (1) and the minor grid plate (4) mounted on the driven portion of the active arm (2) are the main grid plate (3) and the minor grid plate (4) of a capacitive angular movement sensor.

13. The adjustable digital caliper of claim 12, wherein the hinged portions of the active arm (2) and the stationary arm (1) are parallel with respect to each other in transverse direction, the minor grid plate (4) on the driven portion of the active arm (2) and the main grid plate (3) on the stationary arm (1) are parallel with respect to each other in longitudinal direction above the hinged portions of the active arm (2) and the stationary arm (1); straight slots in diagonal direction are provided on the upper front portion or lower front portion of the hinged portion of the stationary arm (1) and on the lower front portion or upper front portion of the active arm (2), and these two slots are vertical to the main grid plate (3) and the minor grid plate (4); straight slots in diagonal direction are also provided on the lower back portion or upper back portion of the hinged portion of the stationary arm (1) and on the upper back portion or lower back portion of the hinged portion of the active arm (2), and these two slots are also vertical to the main grid plate (3) and the minor grid plate (4); the two ends of a supporting spring leaf (7) are inserted in the straight slot on the upper front portion or lower front portion of the hinged portion of the stationary arm (1) and the straight slot on the lower front portion or upper front portion of the hinged portion of the active arm (2) respectively; the two ends of another supporting spring leaf (7) are inserted in the straight slot on the upper back portion or lower back portion of the hinged portion of the stationary arm (1) and the straight slot on the lower back portion or upper back portion of the hinged portion of the active arm (2) respectively; a line passing through the intersection point of the supporting spring leaves (7) and vertical to the main sensor grid plate (3) and minor sensor grid plate (4) is the virtual axis of rotation of the active arm (2) with respect to the stationary arm (1); the lower portion of the hinged portion of the active arm is connected with a vertical active measuring arm, an open-bottom frame is arranged on the other side of the hinged portion of the stationary arm (1), two gliding guide bars (6) in parallel are provided in the rectangular frame, pilot holes for respectively receiving the gliding guide bars (6) are provided on the upper end of the vertical stationary measuring arm (17), a bolt for adjusting measuring range 11 is cooperated with the inner thread on the upper end of the stationary measuring arm (17), the bolt (11) is of self-locking function, the measuring surface on the lower end of the stationary measuring arm (17) faces and is parallel to the measuring surface on the lower end of the active measuring arm and is vertical to the main grid plate (3) and the minor grid plate (4).

14. The adjustable digital caliper of claim 12, wherein the upper end of the hinged portion and the lower end of the stationary arm (1) are provided with at least one horizontal pilot pin (8), the pilot pin (8) is inserted into a corresponding pin hole on the active arm (2).

15. The adjustable digital caliper of claim 14, wherein a dynamometric spring (5) is provided horizontally above the pilot pin (8) and below the main grid plate (3), the dynamometric spring (5) leans on the active arm (2).

16. The adjustable digital caliper of claim 15, wherein the active arm (2) is further mounted horizontally with a lifting screw (10) above the dynamometric spring 5 and below the minor grid plate (4).

17. The adjustable digital caliper of claim 12, wherein the measuring surface of the active measuring arm is further provided with a cylindrical measuring head 13 that is capable to swing slightly.

18. The adjustable digital caliper of claim 12, wherein two pairs of the main grid plate (3) and the minor grid plate (4) are mounted on the stationary arm (1) and the active arm (2), one pair is the main grid plate and the minor grid plate of a calibration sensor, and ½ pitch of the calibration sensor is the measuring range, and the other pair is the main grid plate and the minor grid plate of a measuring sensor.

19. A lever gauge, comprising:
a capacitive sensor core with flexible hinge, comprising a main grid plate (3), a minor grid plate (4) and a mechanism for converting a measurement to a relative movement between the main grid plate and the minor grid plate;
wherein the mechanism comprises a stationary arm and an active arm, the minor grid plate (4) and the main grid plate (3) are respectively mounted on a driven portion of the active arm and the stationary arm, the stationary arm is connected to the active arm by a flexible hinge; the flexible hinge comprises at least two supporting spring leaves (7), each supporting spring leaf (7) is connected to the stationary arm at one end, and the other end of the supporting spring leaf (7) is connected to the active arm; each supporting spring leaf (7) is vertical to the main grid plate (3) and the minor grid plate (4); the flexible hinge between the active arm (2) and the stationary arm (1) comprises the intersected supporting spring leaves (7), the active arm (2) is rotated around the intersection of the supporting spring leaves (7) as the rotation center with respect to the stationary arm (1), the main grid plate (3) mounted on the stationary arm (1) and the minor grid plate (4) mounted on the driven portion of the active arm (2) are the main grid plate (3) and the minor grid plate (4) of a capacitive angular movement sensor.

20. The lever gauge of claim 19, wherein the stationary arm is a stationary frame (1-1), the stationary frame (1-1) is disposed vertically, the active arm (2) is disposed vertically inside the stationary frame (1-1), the minor grid plate (4) mounted on the driven portion of the active arm (2) and the main grid plate (3) mounted in the stationary frame (1-1) are parallel in longitudinal direction; a seat (14) for the supporting spring leaf is provided on the lower end of the active arm (2) outside the stationary frame (1-1); an inclined straight slot is provided on the bottom of the stationary frame (1-1) on the left side of the opening, and an inclined straight slot is provided on the top left portion of the seat (14), and these two straight slots are vertical to the main grid plate (3) and the minor grid plate (4); an inclined straight slot is provided on the bottom of the stationary frame (1-1) on the right side of the opening, and an inclined straight slot is provided on the top right portion of the seat (14), and these two straight slots are vertical to the main grid plate (3) and the minor grid plate (4); the two ends of the two supporting spring leaves (7) are respectively inserted in the straight slots on the stationary frame (1-1) and the straight slots on the seat (14), the obliquity of the two supporting spring leaves (7) which intersect inside the seat (14) is identical, and the intersecting line of the two supporting spring leaves (7) is vertical to the main grid plate (3) and the minor grid plate (4) and is the virtual rotation axis of the active arm (2) with respect to the stationary frame (1-1); the seat (14) is further hinged with a base (15) for the measuring head, the bottom of the base (15) is connected to the measuring stick (16) having a spherical head.

21. The lever gauge of claim 20, wherein the base (15) is hinged to the seat (14).

22. The lever gauge of claim 21, wherein an orientation wheel (18) for the active arm is mounted in the stationary frame (1-1), the orientation wheel (8) is of a groove for movably receiving the active arm (2), the direction of the groove on the orientation wheel (8) is the same as the swinging direction of the active arm (2).

23. The lever gauge of claim 22, wherein a pressing plate (19) that is rotated around a shaft is further mounted inside the stationary frame (1-1), a pin (20) on the upper end of the pressing plate (19) and a pin (20) on the lower end of the pressing plate (19) lean on the two sides of the active arm (2) respectively, an end of a measuring spring (5) is connected to the pin (20) on one side of the active arm (2), and the other end of the measuring spring (5) is connected to the inner surface of the stationary frame (1-1) on the other side of the active arm (2).

24. The lever gauge of claim 23, wherein positioning cams (21) at an upper left position and another lower right position are arranged respectively on the two sides of the longitudinal portion of the active arm (2), and contacted with the outer edge of the pressing plate (19).

25. The lever gauge of claim 19, wherein two pairs of the main grid plate and the minor grid plate are mounted on the stationary arm and the active arm, one pair is the main grid plate and the minor grid plate of a calibration sensor, and ½ pitch of the calibration sensor is the measuring range, and the other pair is the main grid plate and the minor grid plate of a measuring sensor.

26. A micrometer, comprising:
a capacitive sensor core with flexible hinge, comprising a main grid plate (3), a minor grid plate (4) and a mechanism for converting a measurement to a relative movement between the main grid plate and the minor grid plate;
wherein the mechanism comprises a stationary arm and an active arm, the minor grid plate (4) and the main grid plate (3) are respectively mounted on a driven portion of the active arm and the stationary arm, the stationary arm is connected to the active arm by a flexible hinge; the flexible hinge comprises at least two supporting spring leaves (7), each supporting spring leaf (7) is connected to the stationary arm at one end, and the other end of the supporting spring leaf (7) is connected to the active arm; each supporting spring leaf (7) is vertical to the main grid plate (3) and the minor grid plate (4); the flexible hinge between the active arm (2) and the stationary arm (1) comprises the supporting spring leaves (7) that are symmetrically arranged, the active arm (2) performs linear movement with respect to the stationary arm (1) according to the symmetry central line of the supporting spring leaves (7), the main grid plate (3) and the minor grid plate (4) respectively mounted on the stationary arm and the active arm are the main grid plate (3) and the minor grid plate (4) of a linear displacement capacitive sensor.

27. The micrometer of claim 26, wherein the supporting spring leaf (7) is of an angled shape or arc shape, and located symmetrically on the two sides of the active device.

28. The micrometer of claim 27, wherein the stationary arm is a circular casing (1-2), the main grid plate (3) is mounted in the center of the circular casing (1-2), the bottom of the circular casing (1-2) behind the main grid plate (3) is mounted with a vertical guide sleeve, the pilot pin (22) is received in the guide sleeve and the two ends of the pilot pin (22) are exposed out of the guide sleeve, the active device is connected to the stationary device via the flexible hinge, the pilot pin (22) and the guide sleeve form a guide device which performs linear movement with respect to the circular casing (1-2) according to the symmetry central line of the flexible hinge, the front surface of the main grid plate (3) is mounted with the vertical active arm (2), a minor grid plate 4 is mounted on a surface of the active arm (2) facing the main grid plate (3), the upper end of the active arm (2) is connected to the upper end of the pilot pin (22) via transverse connecting element; a straight slot inclined towards the bottom left side is provided on the left side of the body below the main grid plate (3), a straight slot inclined towards the bottom right side from outside to inside is provided on the right side of the body below the main grid plate (3); a straight slot inclined towards the top right side is provided on the left side of the connecting element, a straight slot inclined towards the top left side is provided on the right side of the connecting piece, all the straight slots are vertical to the main grid plate (3) and the minor grid plate (4); angled supporting spring leaves (7) are provided on the two sides of the main grid plate (3), the two ends of each supporting spring leaf (7) are inserted to the straight slots on the connecting element and the main grid plate (3) on the same side, the two supporting spring leaves (7) form a rhombus, the lower end of the active arm (2) is connected vertically with a measuring stick (16), and the measuring stick (16) extends through a mounting hole on the bottom of the circular casing (1-2) and is exposed out of the circular casing (1-2), and the measuring stick (16) has a tapered measuring head on the end.

29. The micrometer of claim 28, wherein each supporting spring leaf (7) is broken at the folded position where a left sliding piece (23) and a right sliding piece (23) are arranged, the supporting spring leaves (7) are received in the straight slots on the left and right sliding pieces.

30. The micrometer of claim 29, wherein a lower sleeve (24) is mounted on the measuring stick (16), the upper end of the lower sleeve (24) is mounted in the mounting hole on the bottom of the circular casing (1-2).

31. The micrometer of claim 26, wherein two pairs of the main grid plate (3) and the minor grid plate (4) are mounted on the stationary arm (1) and the active arm (2), one pair is the main grid plate and the minor grid plate of a calibration sensor, and ½ pitch of the calibration sensor is the measuring range, and the other pair is the main grid plate and the minor grid plate of a measuring sensor.

* * * * *